United States Patent [19]

Clinebell

[11] 3,990,427

[45] Nov. 9, 1976

[54] AIR HUMIDIFYING METHOD AND APPARATUS

[76] Inventor: Virgil L. Clinebell, 1713 Cameo Ave., Loveland, Colo. 80537

[22] Filed: Jan. 9, 1975

[21] Appl. No.: 539,687

[52] U.S. Cl. .............................. 126/113; 261/64 R; 261/116; 261/DIG. 15

[51] Int. Cl.² .............................. F24F 3/14

[58] Field of Search .......... 261/DIG. 15, 116, 64 R; 126/113; 239/434; 62/121; 165/19; 98/30, 109; 236/44 R

[56] References Cited

UNITED STATES PATENTS

| | | | |
|---|---|---|---|
| 1,402,601 | 1/1922 | Handelan | 126/113 |
| 1,574,656 | 2/1956 | Isgrig | 126/113 |
| 1,910,199 | 5/1933 | Brady | 126/113 X |
| 2,303,948 | 12/1942 | Morris | 126/113 |
| 3,247,839 | 4/1966 | Lindberg | 126/113 |
| 3,570,472 | 3/1971 | Santangelo | 126/113 |
| 3,840,001 | 10/1974 | Ernest | 126/113 |
| 3,860,401 | 1/1975 | Clark et al. | 261/DIG. 15 |

*Primary Examiner*—William F. O'Dea
*Assistant Examiner*—William E. Tapolcai, Jr.
*Attorney, Agent, or Firm*—Ancel W. Lewis, Jr.

[57] ABSTRACT

In a method and apparatus for adding controlled quantities of moisture to a body of air, a spray nozzle produces an atomized spray of finely divided water particles and a substantially closed through chamber around the spray nozzle has an air inlet and outlet, a chimney portion extending upwardly from the spray nozzle and a sump portion below the spray nozzle. A pressure is produced at the outlet that is less than at the inlet to produce an updraft through the chimney portion utilizing the updraft in one direction and the forces of gravity in the other for selecting usable water particles in a smaller size range that are capable of being airborne in the updraft and be carried through the outlet and be readily evaporated into a body of air externally of the through chamber and rejecting unusable water particles in larger size ranges incapable of being airborne in the updraft and carried through the outlet by the updraft, the unusable water particles flowing by the forces of gravity countercurrent to the updraft into the sump portion and drain away through a drain hole. The method and apparatus is readily adapted to be used in combination with a forced air furnace and air duct distribution system or as a self contained air humidifying unit not associated with the furnace or its air duct distribution system. For a chimney portion of a given height a variation in the size of the inlet for passing air to the through chamber varies the amount of updraft and thereby the quantity and to a limited extent the size of the water particles passing the outlet for controlling the amount of moisture added to the body of air and balancing the device to the needs of a given installation.

22 Claims, 9 Drawing Figures

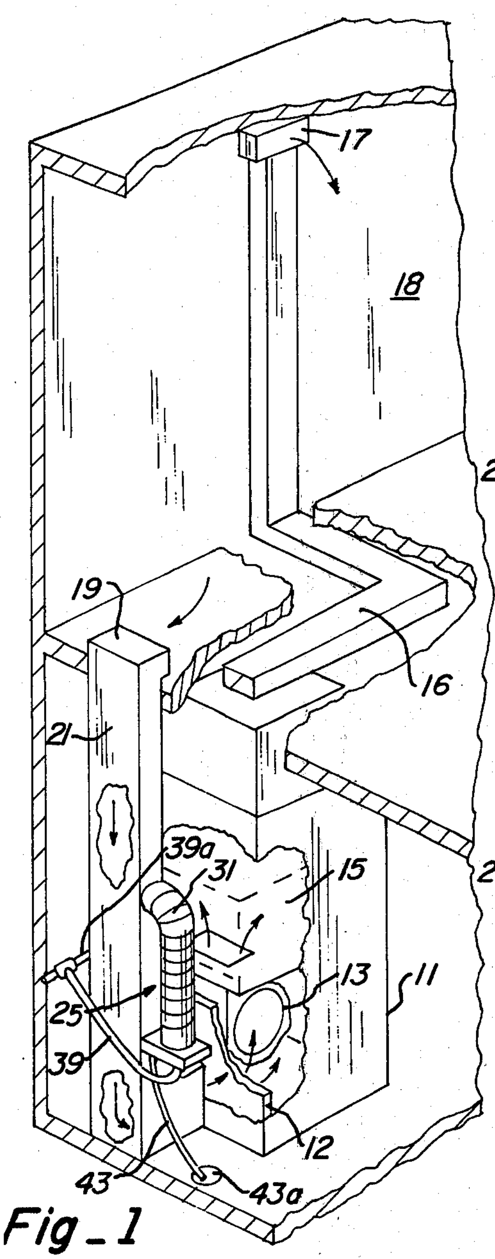
Fig_1
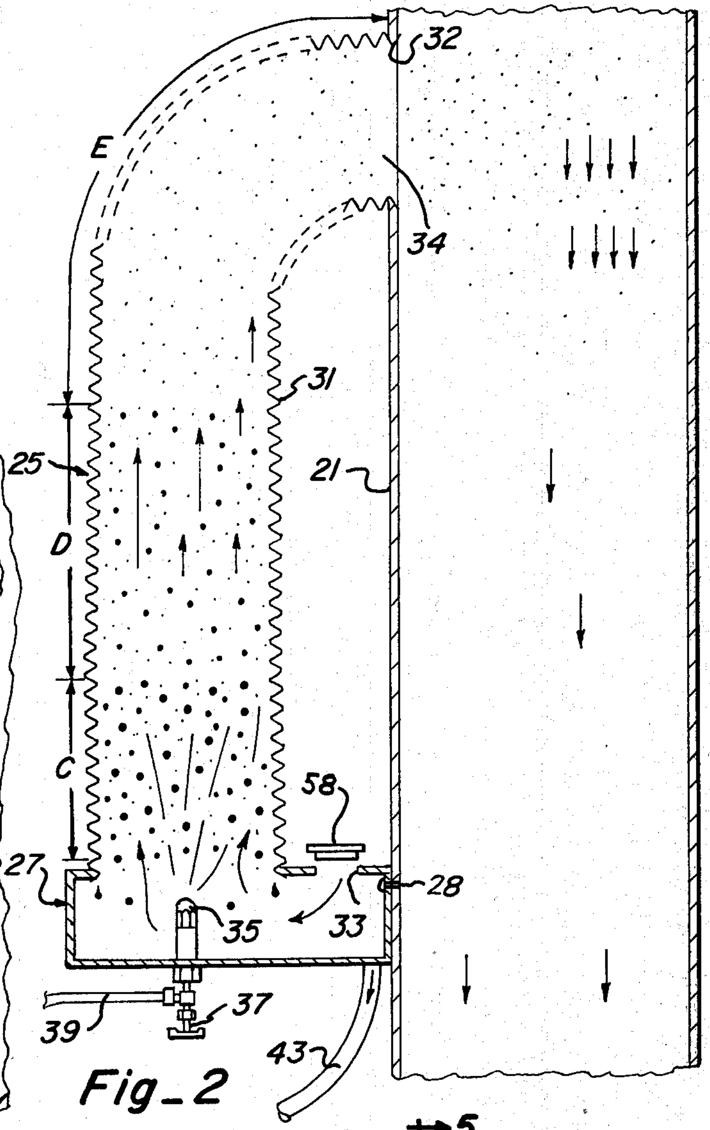
Fig_2
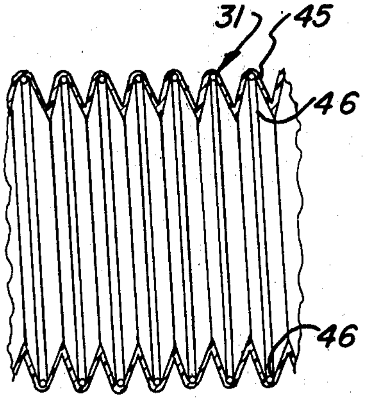
Fig_3
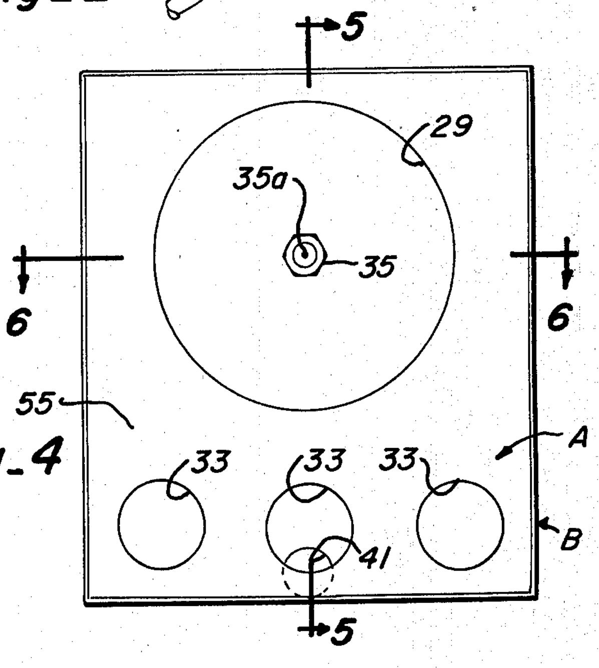
Fig_4

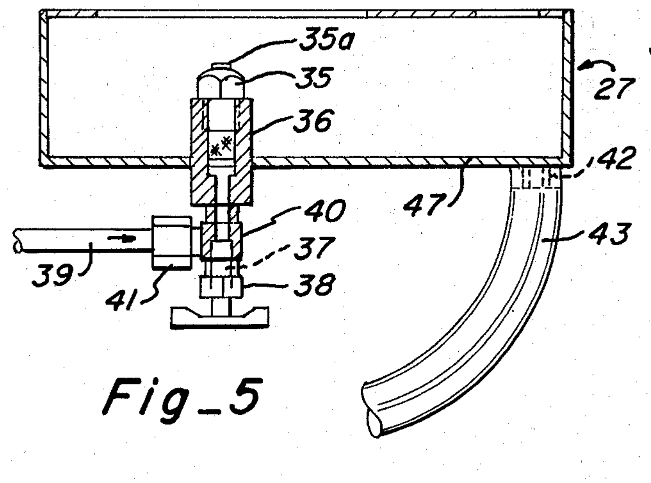
Fig_5
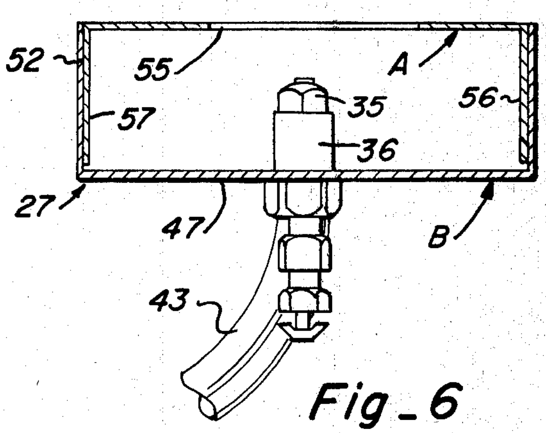
Fig_6
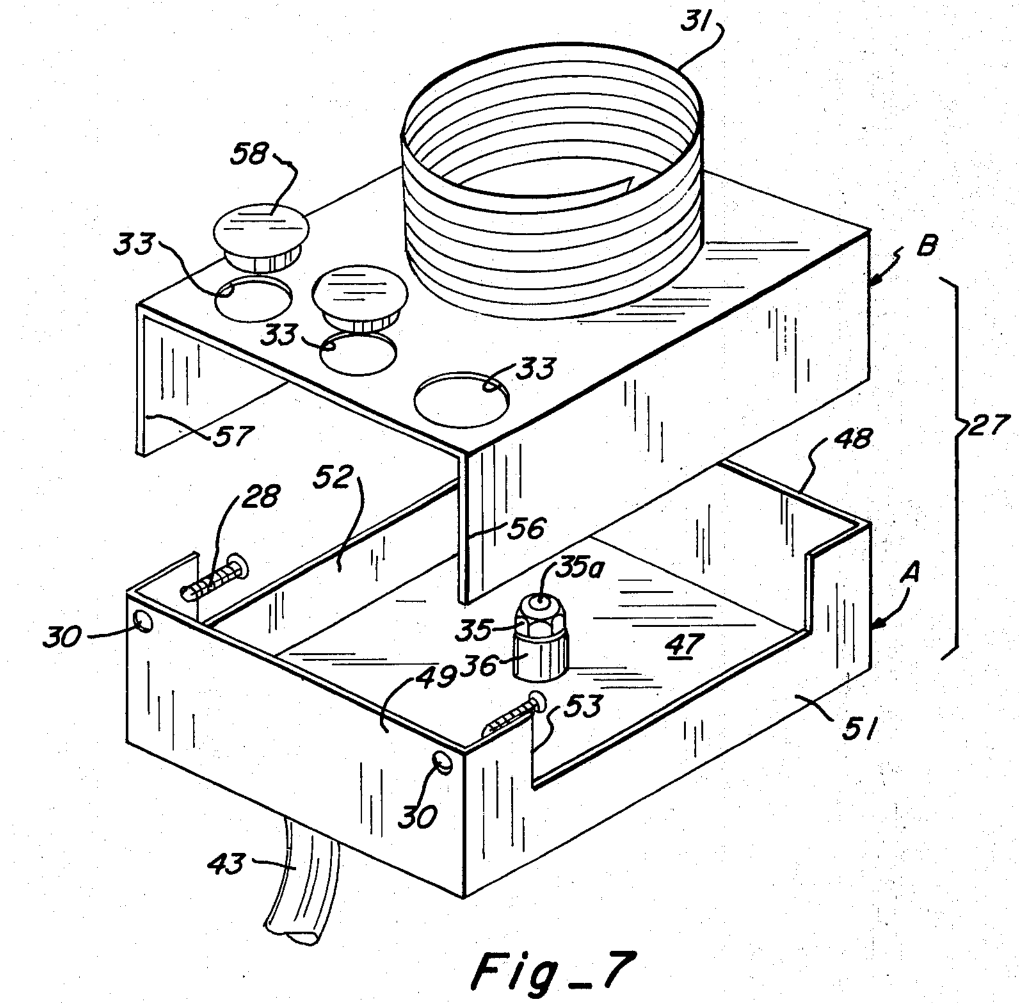
Fig_7

AIR HUMIDIFYING METHOD AND APPARATUS

FIELD

This invention relates to a novel method and apparatus for adding moisture to a body of air that is particularly suitable for increasing the amount of moisture in indoor air to overcome the problems usually associated with low relative humidity or dry room air.

BACKGROUND

The relative humidity of indoor air has been found to greatly affect human comfort and health. Hot dry air has an affinity for moisture and removes moisture from the membranes of the nose and throat making humans subject to various respiratory diseases, coughing, nose and throat irritations and the like. Forced air furnaces are the most common form of heating apparatus for heating indoor air and air heated in this manner absorbs moisture from the surrounding air to cause low relative humidity or unreasonable dry indoor air conditions. In addition to human discomfort and a potential unhealthy situation, dry room air results in drying out and cracking of structures, static electricity associated with the carpet or the like. Numerous attempts have heretofore been made to provide air humidifying devices, apparatuses and methods to add moisture to the indoor air.

In known prior air humidifying devices, apparatus and methods the most frequently used techniques involve evaporation of water off a water surface in a water pan or a porous material. Some attempts have been made to use spray atomizers that produce water particles to be evaporated into the air but these are most frequently sprayed into the hot air side. Some air humidifying apparatus is made a part of the furnace and in some instances the moisture is introduced into the cold air side of the furnace and in others on the hot air side. A number of humidifying room units have also been provided that are entirely separate and independent from that of the furnace.

Included among the more serious problems of introducing moisture into the air and particularly the heated air side of forced air system is the formation of lime and other mineral deposits which clog up the apparatus. Also included in a number of humidifiers are float valves, evaporating pads, control solenoids, blower motors, humidistats and like complex special controls which of course increase cost of purchase and maintenance.

Accordingly, it is an object of the present invention to provide a novel air humidifying apparatus and method for adding controlled quantities of moisture to a body of air in an improved, highly efficient and highly effective manner.

Another object of this invention is to provide novel humidifying apparatus that is relatively simple in construction and operation with relatively few parts, is comparatively maintenance free, is economical to manufacture, and can be installed relatively easily on conventional existing forced air furnaces or furnished as a separate room humidifying unit independent from the furnace and duct system.

Still a further object of the present invention is to provide novel continuously operable humidifying apparatus and method characterized by a continuous flow of water, the production of a mist of finely divided water particles, the selection of smaller sizes of finely divided water particles from the mist that readily evaporate into a body of air at room temperatures without condensation on adjacent walls and rejecting of larger water particle sizes and minerals and foreign matter that does not readily evaporate in a stream or body of air.

Yet a further object of the present invention is to provide a novel relatively simple humidifying apparatus and method that avoids appreciable amounts of mineral or precipitate buildup that might otherwise cause plugging and require maintenance, avoids complex and costly control instruments such as float valves, hydrostat, humidistat, control solenoids, transformers, blowers, electric switches and the like.

Yet another object of the present invention is to provide a novel humidifying apparatus and method that is readily adjusted to regulate the moisture being added to room air and may be operated continuously on a forced air furnace independent of the operation of forced air furnace and does not impair the normal operation of the furnace.

Another object of the present invention is to provide a novel air humidifying method and apparatus that readily removes unwanted water particle sizes, dirt or other foreign matter in the water prior to vaporizing and passing them through the heat exchange of a furnace.

Still another object of the present invention is to provide a novel air humidifying method and apparatus that may afford maximum, moisturizing of the room air during furnace operation and a lesser moisturizing of the room air when the furnace blower is not running.

Still another objext of the present invention is to provide a novel air humidifying apparatus and method characterized by the use of a fresh, continuously flowing supply of water at normal tap pressures and to form a continuous spray of finely divided water particles, the selection of the water particles that are capable of being evaporated into a stream of air at normal room temperatures by the regulation of the amount of an updraft, the evaporation of the selected water particles into a stream of air so that they vaporize and remain suspended in the air as a vapor and do not condense on duct walls and the like and the removal of the larger unwanted water particles and foreign matter by gravity forces which pass in a countercurrent flow to the updraft and through a drain hole.

Other objects, advantages and capabilities of the present invention will become more apparent as the description proceeds taken in conjunction with the accompanying drawings, in which:

FIG. 1 is a perspective view of a forced air furnace and air distributing duct system for a room with an air humidifying device embodying features of the present invention mounted thereon;

FIG. 2 is a vertical sectional view of the air humidifying device of FIG. 1 mounted on the cold air duct of the furnace and duct system shown in FIG. 1;

FIG. 3 is a vertical sectional view through a portion of the tubular member of FIGS. 1 and 2;

FIG. 4 is a top plan view of the support housing of FIGS. 1 and 2 with the tubular member removed;

FIG. 5 is a sectional view taken along lines 5—5 of FIG. 4;

FIG. 6 is a sectional view taken along lines 6—6—6 of FIG. 4;

FIG. 7 is a perspective exploded view of the air humidifying device shown in FIGS. 1 through 6 with the upper cover section raised above the lower pan section to illustrate assembly and access features of the device shown herein;

Figure 8:
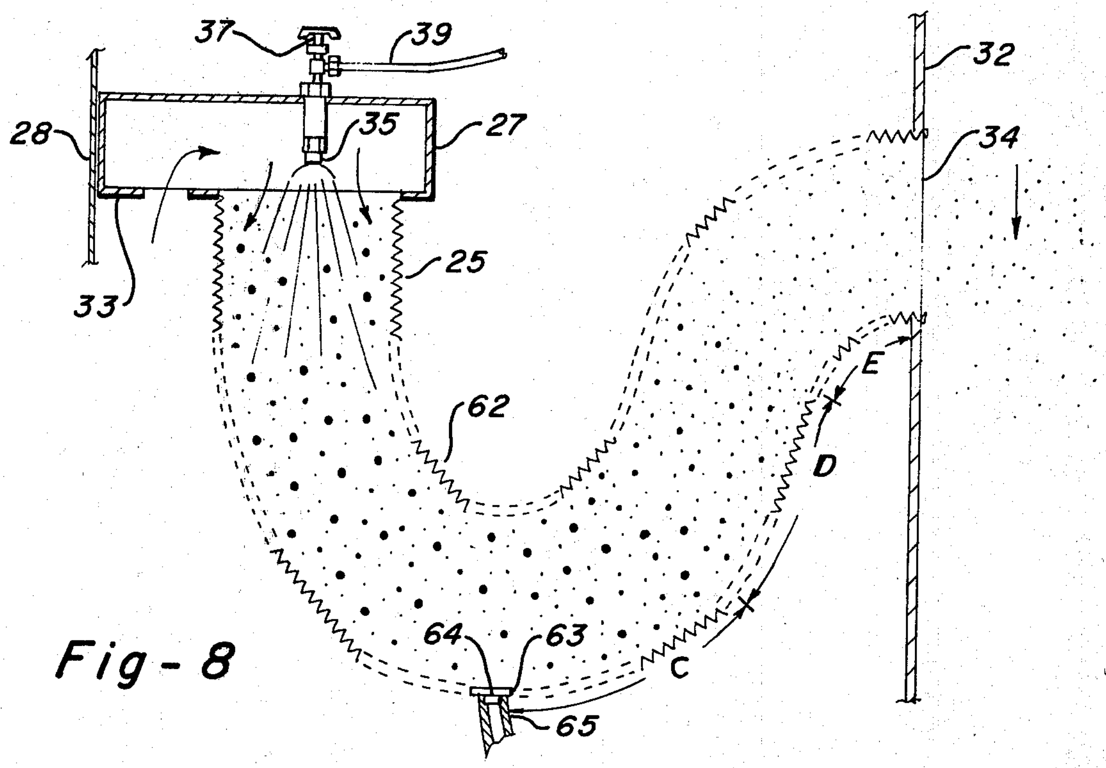
FIG. 8 is a vertical sectional view of an air humidifying device with a downturned orientation for the spray nozzle.

Referring now to the drawings in FIGS. 1 through 6, there is shown a conventional forced air furnace and air distributing duct system including a furnace generally desiganted by numeral 11 having a filter 12, blower 13 driven by a blower motor and heat exchanger 15. The duct system shown includes a hot air duct 16 for passing heated air from the heat exchanger 15 to one or more heat registers represented at 17 in a room 18 which also has a return cold air register 19. A return air or cold air return duct designated by numeral 21 conveys the air from the room back to the intake side of the furnace where it is passed through the filter 12, blower 13 and the heat exchanger 15 in that order for reheating. An air humidifying device made and operated in accordance with the present invention shown in FIGS. 1 through 7 is generally designated by numeral 25 mounted on the cold air or return air duct 21 at a position a selected distance above the inlet to the filter 12.

The air humidifying device 25 shown, in general, is comprised of a rigid support housing 27 mounted on the side of the cold air duct 21 by a pair of bolt fasteners 28. The support housing 27 has a circular opening 29 in the top through which one end of a flexible chimney tubular member 31 having a circular transverse cross section is inserted and held, the tubular member 31 extends above the support housing and turns in at a right angle at the upper end with the end remote from the support housing being inserted into a circular opening 32 in the cold air duct 21.

In the construction shown, the support housing 27 and tubular member 31 define a substantially closed through chamber for the flow of air having an upper chimney portion defined essentially by the inside of the tubular member 31 and a lower sump portion defined essentially by the inside of the support housing 27. This through chamber is closed except for three air inlet openings 33 in the top of the housing and the upper open end of the tubular member which forms an air outlet designated 34.

An atomizer spray nozzle 35 is removably mounted in a nozzle fitting body 36 secured in the bottom of the support housing located on a line through the center of the top opening 29 with the outlet orifice 35a of the nozzle below the top of the support housing so that the nozzle will spray a mist of finely divided water particles up into the inside of the tubular member as shown. In the construction shown, the nozzle fitting body 36 has a portion inside the housing with an internally threaded wall surface that receives external threads on the spray nozzle 35. This permits removal of the spray nozzle for cleaning when necessary. A T-shaped valve body 40 has three externally threaded end portions at right angle intervals, one of the end portions is threaded into internal threads on the other end of the nozzle fitting body 36 that extends below the bottom of the support housing. The valve body 40 has a through bore that receives an externally threaded valve stem 37 held by a cap 38 threaded on a second externally threaded end portion. The valve stem is rotated to regulate the water flow from a water supply line 39 to the spray nozzle 35. The water supply line is shown as held on a third externally threaded end portion in communication with the passage of the valve body 40, the line being hold in place by an internally threaded cap 41. The nozzle 35 shown is specifically adapted to mechanically break up the water into finely divided particles in a fan-like pattern and spray continuously an adequate amount using normal tap water pressure that is usually on the order of 70 psi to 75 psi. In a typical residential forced air furnace installation there will be a cold water line to the water heater that can conveniently supply water at tap pressure to the nozzle via line 39. This can be conveniently hooked up by means of a saddle valve attached to the cold water line so that the operation of the device can be turned on and off by regulating the saddle valve. A cold water supply line is represented in FIG. 1 at 39a. A drain hole 44 with a rigid depending drain tube stub 42 is provided in the bottom of the housing. A flexible drain hose 43 is coupled over the drain tube stub 42 to convey drainage water away from the housing to a suitable drain represented in FIG. 1 at 43a.

In the preferred embodiment shown, a preferred form of tubular member 31 is one that is adjustable and flexible in length to expand and retract lengthwise thereof and will flex radially to contract and expand radially. A preferred construction shown in more detail in FIG. 3 is in the form of a plastic tubular body 45 wrapped over a helical coil 46. The tubular body has an external diameter less than that of the coil and expands around the coil to form a corrugated pattern. The openings 29 and 32 are selected in relation to the diameter of the tubular member such that they are of a slightly smaller size and require the end portion of the tubular member to be contracted upon insertion into the hold and then be held in place due to the resiliency of the tubular member. This construction is also generally resistent to rust and corrosion.

The support housing shown in FIGS. 1 through 7 is made as a lower pan section A and an upper cover section B for ease of manufacture, assembly, access to the inside for rinsing and cleaning and access to the spray nozzle for removal, cleaning and replacement when necessary. The lower pan section B is mounted on the cold air duct as shown in FIGS. 1 and 2 and has a rigid bottom wall 47, a rigid front wall 48, a rigid rear wall 49 and a pair of opposed rigid side walls 51 and 52. Each side wall has notched section 53 that permits lifting of the cover section B. The cover section B is generally channel shaped and disposed as an inverted channel with the top wall 55 and a pair of depending side walls 56 and 57 that slide fit between the side walls of the lower pan section A. The pan section A and cover section B are preferably made of a moisture resistant material and in an embodiment such as that shown above can conveniently and economically be made of galvanized sheet metal.

In a typical installation of the air humidifying device 25 above described on a cold air duct 21 the cover section B is removed and the bottom pan section A is fastened to the duct a selected substantial distance above the air filter 12 by means of a pair of screw fasteners 28. The circular openinb 32 is made in the cold air duct above the bottom a selected distance and one end of the flexible tubular member 31 is inserted thereinto. The other end of the tubular member 31 is placed in the opening 29 in the top wall 55 and the cover section B is then inserted into the pan section A. To operate the device then (assuming the saddle valve at the water pipe is turned on) the valve stem 37 is turned to an on position and the spray nozzle 36 sprays up a mist of finely divided water particles into the chimney portion formed by the inside of the tubular member 31. When the furnace 11 is running a negative pressure with respect to ambient room pressure is present at the outlet by virtue of the air flow in the cold air duct. The pressure at the outlet 34 then is less than that at the inlets 33 and this causes a flow of air to be pulled through the inlets 33, past the spray nozzle and produces an updraft in the tubular member 31. There is then a combination of the effects of the updraft in one direction and gravity in the other and the updraft selects water particles herein referred to as usable water particles in a smaller size range capable of being airborne in the updraft and carries them through the outlet 34 where they readily and quickly evaporate into the air stream in the cold air duct. A closing of one or more of the openings of the inlets 33 changes the amount of updraft for a given height for the chimney portion and thus the amount of air flow through the outlet. As the amount of updraft is decreased by closing off the inlet holes only the smallest water particles that will be discharged into the air stream in the cold air duct. The amount and water particle size discharged may also be varied by adjusting the height of the tubular member and its outlet above the spray nozzle with the higher the chimney portion the less the moisture and smaller the particle size discharged, but usually the control of the air flow through the inlets is adequate for a given furnace installation. A removable plug 58 is provided for each inlet opening for the selective closing thereof.

In observing this apparatus in operation it is apparent that there are three general classifications of water particles in the through chamber: large, medium and small that are present in three zones designated C, D and E. In a lower zone C directly above the nozzle there is found large, medium and small water particles. In a next higher zone D there are medium and small water particles and in the highest zone E that terminates in the outlet 34 there are only the small water particles. The fan-like spray action of the spray nozzle forces the downflowing larger and medium size particles against the inside wall surfaces of the tube 31 and they drip down into the support housing 27. The amount of updraft through the chimney portion will alter these zones C, D and E to some extent with a few medium and larger particles reaching the outlet if the air draft is excessive.

While it is appreciated that the changing of the size of the inlet openings 33 changes the updraft and to some extent the quantity and size of the water particles reaching the outlet, for a given installation the closures for the holes essentially function to balance the device to the needs of a particular room volume and once the device is in operation and particular updraft is established for that installation it is usually not necessary to frequently change these inlet openings to maintain a desirable humidity level.

The smaller or fine water particles that pass through the outlet 34 into the cold air stream are so fine they do not collect on a surface placed in front of the outlet but rather pass with the flow of air around this surface. These fine water particles may be observed by directing a light beam into the cold air duct across the path of the updraft through outlet opening 34. It is further observed that they readily disappear as they are evaporated or absorbed into the larger stream of air in the lower portion of the cold air duct prior to passing through the filter and that there is no condensation on the inside of the duct walls. There can be no condensation because the duct walls are not colder than the water particles and the cold air in the cold duct in which they are traveling.

In the operation of a forced air furnace there are usually two modes, the first when the blower is running and the heat exchanger is on and a second when the blower is off and the heat exchanger is not heating. In the first mode, there is a substantial air flow in the cold air duct and during this time the updraft in the chimney portion is maximum and a maximum amount of moisture is being added to the air in the cold air duct. In the second mode a lesser air flow is still present in the cold air duct caused by the burning of the pilot light. During this mode the device preferably adds less moisture to the air because there is less draft up the chimney portion when the furnace blower is not running. In this way maximum moisture is added when most necessary and a lesser amount is added to the air passing through the duct system and into the room even when the furnace blower is not running.

As shown in FIG. 8, the above described air humidifying device need not necessarily be oriented with the spray nozzle directed upwardly. In the arrangement shown also in operative association with the cold air duct 21, the support housing 27 is in an inverted position from that shown previously and is illustrated as mounted on a support 61 and the spray nozzle 35 is directed downwardly. In this form the tubular member 62 is of a longer construction and arranged in a generally U-shape so that one portion coupled to the housing is directed downwardly and an intermediate position forms a sump with a drain plug 63 and opening 64 with a drain tube 65 and the other upright portion forming the chimney portion turns up having its free end inserted into an opening 34 in the cold air duct 21. The support housing again will have inlet holes 33 in the now bottom wall or they could be provided in the now top wall so that a draft is pulled through the inlet openings and past the water particles and the smaller particles are carried by the updraft through the outlet 34. In this form the separating action takes place in the upright portion upstream of the drain plug 63 with the three zones C, D an E also present in this form.

Figure 9:
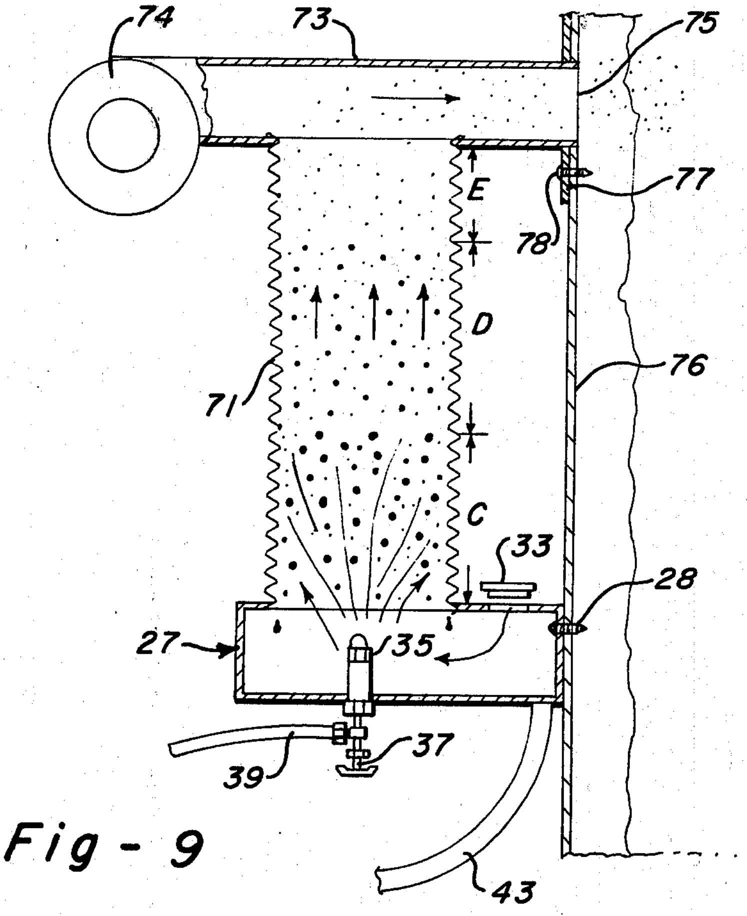
FIG. 9 is a vertical sectional view of an air humidifying device for a room that is not a part of the forced air furnace and duct system.

Referring now to FIG. 9, there is shown an air humidifying device 25 that is independent of the furnace and is specifically adapted to add moisture to individual rooms or the like. In this device there is the same support housing 27 and a flexible tubular member designated 71, but the upper end of the tubular member 74 is positioned in an opening 72 in a duct 73 that extends normal thereto and arranged so that the end is in a horizontal plane. At one end of the duct there is a blower 74, preferably electric motor driven, and the opposite end has an outlet opening 75 through which the humidified air is discharged through a wall 76 into a room or like body of air. The duct 73 is shown as having a flange 77 fastened to the wall 76 by fastener 78. In this form when the blower 74 is turned on it causes an air flow past the outlet of the tubular chimney portion and the operation is the same as with the other devices above described. In this case the device operates only when the blower is on.

From the foregoing description it is apparent that the method and apparatus of the present invention through the use of an updraft and gravity affords a close selection of water particles from a mist that has been mechanically produced that are small enough to become airborne in the updraft and readily evaporate into an airstream or body of air outside a through chamber and utilizes a principle of evaporation from carefully controlled mist rather than off a surface of a body of water. The unusable or undesirable water particles that are too large to evaporate quickly never reach the outlet and these with possible other foreign matter drain away providing a continuous flushing of the system. Once the valve 37 is turned on, the device is operable continuously and when there is no updraft no water particles rech the outlet. The water sprayed merely drains away.

A distinct advantage of the present invention over humidifiers that spray into the hot air plenum (usually operating at 125° F to 145° F) is that if the spray nozzle would partially plug or malfunction the poorly atomized water would only go down the drain and not onto the furnace parts. However, it should be pointed out that the atomizer nozzle of the present invention does not tend to partially plug or malfunction nearly as often as the prior art spraying into the hot plenum because there is considerably less heat caused corrosion when operated on the cold air side (usually 70° to 80° F with an average of about 75° F).

The method and apparatus of the present invention does not use appreciable amounts of water (a typical nozzle sprays about 10 gallons per 24 hour period at typical tap pressure) making it highly efficient because the spray nozzle has a very limited water requirement. Because the water is sprayed from the tap water line using tap pressures, it is cold water and because it is associated with the cold air duct and there is no tendency for mineral buildup, the cold tap water has a tendency to keep the device operating at even below room or cold air duct temperatures. No electric switches or other complex devices are required. The spray nozzle 35, a control valve 37 and plugs 58 are the only controls used.

Included by way of example and not by way of limitation an air humidifying device found suitable for installation on a conventional forced air furnace has the following dimensions:

| | |
|---|---|
| Average diameter of tubular member 31 | About 4" |
| Dimension of support housing 27 | 7" × 6" × 1⅞" |
| Dimension of inlet openings 33 | 1⅛" |
| Spray nozzle 35 | About .37 gal. per hour at 40 psi 60° spray fan |
| Height of chimney portion (Measured from mounting holes 30 to center of opening 32) | About 30" |

Although the present invention has been described with a certain degree of particularity, it is understood that the present disclosure has been by way of example and that changes in details of structure may be made without departing from the spirit thereof.

What is claimed is:

1. In a method of adding controlled quantities of moisture to a body of air, the steps of:

confining a mist of finely divided water particles in a liquid form in a substantially upright through chamber, providing an inlet into said through chamber separate from a source of said water particles that is open to the atmosphere, providing an outlet from said through chamber that is at less than atmospheric pressure to produce an updraft through the chamber past the water particles; and selectively varying the amount of said updraft to select water particles from said mist according to size thereby selecting water particles of a smaller size range capable of becoming and remaining airborne in the updraft and being readily evaporated that are carried by the updraft through the outlet and evaporate into a body of air externally of the through chamber and rejecting water particles of a larger size range incapable of becoming and remaining airborne in the updraft and carried through the outlet and incapable of being readily evaporated that are separated and removed from the selected water particles by gravity and flow in a direction countercurrent to said updraft.

2. In a method as set forth in claim 1 including the establishing of a selected amount of updraft for balancing the amount of moisture through the outlet with the humidity requirements of the body of air being humidified.

3. In a method as set forth in claim 1 including the varying of the amount of the updraft flow to regulate the amount of the water particles passing through the outlet.

4. In a method as set forth in claim 1 wherein said chamber is at substantially indoor room temperatures in a range of about 70° to 80° F.

5. In a method as set forth in claim 1 wherein said mist of water particles are directed upwardly into the through chamber.

6. In a method as set forth in claim 1 wherein said mist of water particles are directed downwardly into an inlet tubular portion leading to an upright chimney portion of the through chamber.

7. In a method as set forth in claim 1 wherein the pressure at the outlet is the negative pressure resulting from the air flow through the cold air duct of a furnace and duct system and said confining and selecting steps are carried out externally of said furnace and duct system.

8. In a method as set forth in claim 1 wherein the pressure at the outlet is a negative pressure resulting from the forcing of a stream of air past the outlet of the through chamber.

9. In a method as set forth in claim 1 wherein the pressure used to produce the mist of water particles is substantially tap water pressure.

10. In a method of adding controlled quantities of moisture to a body of air moving in the cold air duct of a duct system of a furnace the steps of:

directing a spray of finely divided water particles upwardly into a substantially upright through chamber having an inlet and an outlet arranged to produce an updraft through the chamber when a negative pressure is produced at the outlet in relation to the pressure at the inlet, said chamber being external of said duct system of a furnace; and selecting water particles from said mist according to size by having said inlet open to the atmosphere and said outlet positioned in said cold air duct to provide an air flow past said outlet to reduce the pressure at said outlet to less than atmospheric pressure to draw an updraft of air flow through the chamber moving from said inlet to said outlet to select water particles of a smaller size range capable of becoming and remaining airborne in the updraft and being readily evaporated that are carried by the updraft through the outlet and evaporate into a body of air externally of the through chamber and reject water particles of a larger size range incapable of becoming and remaining airborne in the updraft and carried through the outlet and incapable of being readily evaporated that are separated and removed from the usable water particles by gravity and flow in a direction countercurrent to said updraft.

11. In apparatus for adding controlled quantities of moisture to a body of air, the combination comprising:

means for producing a mist of finely divided water particles; and housing means defining a through chamber around said mist-producing means, said through chamber having an inlet and an outlet for selecting water particles from said mist according to size in response to having said inlet open to the atmosphere and said outlet at less than atmospheric pressure to produce an updraft through the through chamber from said inlet to said outlet past the water particles to utilize the forces of the updraft and gravity for selecting water particles of a smaller size range capable of becoming and remaining airborne in the updraft and being readily evaporated that are carried through the outlet and evaporated into a body of air externally of the chamber and for rejecting water particles of a larger size range incapable of becoming and remaining airborne in the updraft that are separated and removed from the selected water particles and carried through the outlet that pass by the forces of gravity in countercurrent relation to the updraft.

12. In apparatus as set forth in claim 11 wherein said housing means includes a substantially rigid support housing and a flexible tube supported by and extending away from and in communication with the inside of the support housing, the support housing supporting a spray nozzle directed into the inlet end of the flexible tube and having a plurality of inlet openings therein, the end of the tube opposite the housing forming said outlet.

13. In apparatus as set forth in claim 12 wherein said flexible tube has a helical coil covered by a tubular plastic body to flex lengthwise and radially and is corrosion resistant.

14. In apparatus for adding controlled quantities of moisture to a body of air moving in the cold air duct of a duct system of a furnace and the like, said humidifying apparatus comprising:

a support housing having a chimney tubular member supported at one end therein and in open communication with the inside of the support housing to define a through chamber having an upright upper chimney portion and a lower sump portion with a drain opening in the support housing, said through chamber being substantially closed except for at least one inlet opening in the support housing and an outlet in the upper end of the chimney tubular member; and a spray nozzle mounted in the support housing directed toward the chimney tubular member, said spray nozzle having control valve which in turn is adapted to be coupled to a source of water under pressure for producing a mist of finely divided water particles in the chimney tubular member, said inlet being at atmospheric pressure and said outlet being positioned in the cold air duct to provide an air flow past said outlet to reduce the pressure at the outlet below atmospheric pressure to draw an updraft through the chimney portion moving from said inlet to said outlet to utilize the forces of the updraft and gravity for selecting usable water particles of a smaller size range capable of becoming and remaining airborne in the updraft and being readily evaporated that are carried through the outlet and evaporated into a body of air externally of the chamber and for rejecting unusable water particles of a larger size range incapable of becoming and remaining airborne in the updraft and carried through the outlet that are directed by the spray against the inner surfaces of the chimney tubular member and pass by gravity flow in countercurrent relation to the updraft into the sump portion and through the drain opening.

15. In apparatus as set forth in claim 14 wherein said chimney tubular member is in the form of an open-ended flexible tube with one end forming said outlet and capable of lengthwise expansion and retraction to vary the quantity and size of water particles discharged through the outlet.

16. In apparatus as set forth in claim 14 wherein said support housing is constructed as first and second sections that are separable from one another, said first section being in the form of a pan with a bottom wall, upright side walls, a front wall and a rear wall, said second section being in the form of an inverted channel-shaped cover with a top wall and a pair of depending flange walls arranged to releasably insert between the side walls of the first section.

17. In apparatus as set forth in claim 16 wherein said top wall has an opening at which one end of the chimney tubular member is secured and a plurality of inlet openings of a selected size with selected ones of said inlet openings being selectively closed by closure members to regulate the amount of updraft through the chimney tubular member.

18. In apparatus as set forth in claim 16 wherein said spray nozzle is mounted on the bottom of said pan section and directed upwardly into the chimney tubular member.

19. In apparatus as set forth in claim 14 wherein said chimney tubular member has a downturned portion that extends down from the support housing an an upright chimney portion that extends upwardly from the downturned portion with an intermediate sump portion with a drain opening, said spray nozzle being directed downwardly into said downturned portion with the water particles being carried upwardly into the chimney portion by said updraft.

20. In apparatus as set forth in claim 14 wherein said pressure producing means is the air flow in the cold air duct in a forced air furnace.

21. In apparatus as set forth in claim 14 wherein said pressure producing means is in a duct arranged substantially normal to the outlet of the chamber having an air pressure source arranged to produce a stream of air in the duct into which the water particles are drawn and evaporated into a surrounding body of air at an outlet in the duct.

22. In a forced air heating system for supplying heated air to one or more rooms including a furnace having a heat exchanger for heating air, a duct system including a hot air duct for passing heated air from the heat exchanger to the rooms and a cold air duct for returning room air to the heat exchanger and a blower for moving the air through the duct system for producing a draft air flow in the cold air duct in a first mode of operation and producing less draft air flow in the cold air duct when the blower is not running in a second mode of operation, a cold water pipe and a drain, an air humidifying device arranged externally of said furnace and said duct system, said air humidifying device adding moisture to the air in said cold air duct and in turn into said one or more rooms comprising, in combination:

a support housing mounted on the cold air duct having a chimney tubular member with one end supported on the support housing in open communication with the inside of the support housing and the other end inserted into an opening in the cold air duct a selected distance above the support housing upstream of said blower to define a through chamber having an upright chimney portion in the tubular member and a sump portion in the support housing, said through chamber being substantially closed except for a plurality of inlet openings in the support housing open to the atmosphere and an outlet in the upper end of the chimney tubular member in flow communication with the cold air duct;

a spray nozzle mounted in the support housing directed into the chimney tubular member;

a control valve for the spray nozzle externally of the support housing coupled to the cold water line whereby when the control valve is on a mist of finely divided water particles emits from the nozzle upwardly into the chimney portion, said draft air flow in said cold air duct providing a pressure less than atmospheric pressure at said outlet whereby a first amount of updraft is produced in the chimney portion in the first mode of operation and a second lesser amount of updraft in the second mode of operation to utilize the updraft in the chimney portion and gravity for selecting water particles of a smaller size range capable of becoming and remaining airborne in the updraft and being readily evaporated that are carried through the outlet and evaporated into the air in the cold air duct prior to reaching the blower and for rejecting water particles of larger size range incapable of becoming and remaining airborne in the updraft and are directed by the spray against the inner surfaces of the chimney portion and are separated from the particles of a smaller size range and pass by gravity flow into the sump portion through the drain opening through a conduit to the drain; and closure means for regulating the amount of air flow through said inlet openings to regulate the size and amount of water particles passing through said outlet and balance the updraft through the chimney portion to meet the moisture requirements of the air in said rooms.

* * * * *